United States Patent
Park

(10) Patent No.: US 9,068,692 B2
(45) Date of Patent: Jun. 30, 2015

(54) STAND DEVICE

(75) Inventor: Bum-Su Park, Seoul (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 527 days.

(21) Appl. No.: 12/683,545

(22) Filed: Jan. 7, 2010

(65) Prior Publication Data

US 2010/0171671 A1  Jul. 8, 2010

(30) Foreign Application Priority Data

Jan. 7, 2009  (KR) ........................ 10-2009-0001291

(51) Int. Cl.
| | |
|---|---|
| H01Q 1/12 | (2006.01) |
| F16M 11/10 | (2006.01) |
| F16M 13/00 | (2006.01) |
| H01Q 1/08 | (2006.01) |

(52) U.S. Cl.
CPC ............... *F16M 11/10* (2013.01); *F16M 13/00* (2013.01); *F16M 13/005* (2013.01); *H01Q 1/084* (2013.01); *H01Q 1/1207* (2013.01); *H01Q 1/1242* (2013.01)

(58) Field of Classification Search
CPC ... H01Q 1/1242; H01Q 1/084; H01Q 1/1207; F16M 11/10; F16M 13/00; F16M 13/005
USPC ................. 343/702, 720, 878, 880–882, 892; 248/688, 454, 455; 455/575.7
See application file for complete search history.

(56) References Cited

U.S. PATENT DOCUMENTS

| | | | | | |
|---|---|---|---|---|---|
| 2,388,567 | A | * | 11/1945 | Patterson, Jr. | ................ 455/351 |
| 3,249,946 | A | * | 5/1966 | Flanagan | ...................... 343/758 |
| 4,165,856 | A | * | 8/1979 | Wiseheart | ..................... 248/449 |
| 5,366,197 | A | * | 11/1994 | Westland | ...................... 248/456 |
| 5,503,361 | A | * | 4/1996 | Kan-O et al. | ................ 248/688 |
| 5,797,578 | A | * | 8/1998 | Graffeo et al. | ............... 248/453 |
| 6,098,952 | A | * | 8/2000 | Tonn | ............................ 248/688 |
| 6,418,010 | B1 | * | 7/2002 | Sawyer | .................... 361/679.05 |
| 6,971,622 | B2 | * | 12/2005 | Ziegler et al. | ................. 248/454 |
| 2005/0250532 | A1 | | 11/2005 | Hwang et al. | |
| 2007/0210172 | A1 | | 9/2007 | Moon et al. | |

FOREIGN PATENT DOCUMENTS

| | | |
|---|---|---|
| KR | 10-2006-0045506 A | 5/2006 |
| KR | 10-0713495 B1 | 4/2007 |
| KR | 10-0826562 B1 | 4/2008 |

* cited by examiner

*Primary Examiner* — Michael C Wimer
(74) *Attorney, Agent, or Firm* — Cha & Reiter, LLC.

(57) ABSTRACT

A stand device capable of providing different folding angles includes a base member, a sliding member disposed to the base member so that a linear reciprocal motion is possible, a stand member having a specific length and fastened to one end of the sliding member in a rotatable manner, and a link member, of which one end is hinge-connected to a proper place in the stand member and the other end is hinge-connected to the base member, for holding the stand member, wherein an opening angle of the stand member varies depending on a linear reciprocation level of the sliding member.

20 Claims, 4 Drawing Sheets

STAND DEVICE

CLAIM OF PRIORITY

This application claims the benefit of the earlier filling date, under 35 U.S.C. §119 of that patent application, entitled "STAND DEVICE", filed in the Korean Intellectual Property Office on Jan. 7, 2009 and assigned Serial No. 2009-0001291, the contents of which are incorporated by reference in its entirety, herein.

BACKGROUND OF THE INVENTION

1. Field of the Invention

The present invention relates to a stand device, and more particularly, the present invention relates to a stand device for propping up a machine at various angles.

2. Description of the Related Art

A stand device is used for a general docking purpose or for the purpose of propping up a mechanical, an electronic device, or the like designed to deliver visual information and/or voice information. One example of an electronic device is a portable computer, which is not equipped with a hinge member, for controlling an inclination angle of a display surface and having a display element employing a pen input mechanism or a touch-key input mechanism. Without the stand device, the portable computer generally lies on a flat surface in a horizontal orientation when the user performs an input operation.

A fold-type stand mechanism is widely used in the stand device. In this mechanism, a stand in a folded position is unfolded and then the electronic device is propped up by the stand. However, the use of the stand device employing the fold-type stand mechanism causes user inconvenience since a machine can be propped only at a one predetermined angle. In addition, a simple connection structure of the stand device employing the conventional fold-type stand mechanism results in frequent failures.

SUMMARY OF THE INVENTION

An exemplary of aspect of the present invention is to provide a stand device for propping up a machine at various angles depending on a situation, thereby providing a user with many options of operation modes.

Another exemplary aspect of the present invention is to provide a stand device that enhances the external appearance of a machine.

Still another aspect of the present invention is to provide a stand device having a robust connection structure and thus having an excellent durability against frequent operations.

In accordance with an exemplary aspect of the present invention, a stand device of a machine includes a base member, a sliding member disposed in the base member so that a linear reciprocal motion is possible, a stand member having a specific length and fastened to one end of the sliding member in a rotatable manner, and a link member, of which one end is hinge-connected to a proper place in the stand member and the other end is hinge-connected to the base member, for holding the stand member, wherein an opening angle of the stand member varies depending on a linear reciprocation level of the sliding member.

Other exemplary aspects, advantages and salient features of the invention will become more apparent to those skilled in the art from the following detailed description, which, taken in conjunction with the annexed drawings, discloses exemplary embodiments of the invention in more detail.

BRIEF DESCRIPTION OF THE DRAWINGS

The above features and advantages of certain exemplary embodiments of the present invention will be more apparent from the following detailed description taken in conjunction with the accompanying drawings, in which.

DETAILED DESCRIPTION OF THE INVENTION

Figure 1:
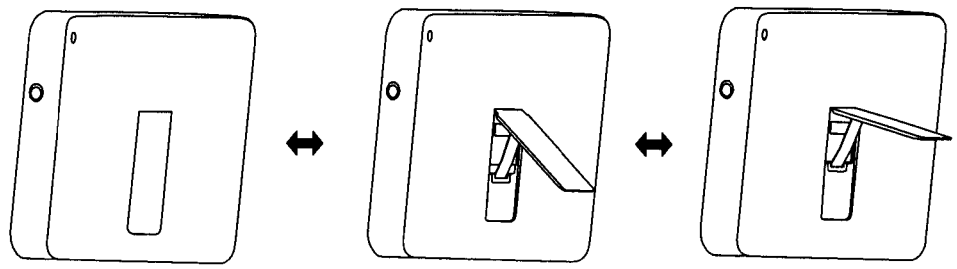
FIG. 1 is a perspective view of a machine employing a stand device according to an exemplary embodiment of the present invention.

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the embodiments described herein can be made without departing from the scope and spirit of the invention. For the purposes of simplicity and avoid redundancy, descriptions of well-known functions and constructions may be omitted for clarity and conciseness so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

Preferred embodiments of the present invention will be described below with reference to the accompanying drawings.

A machine employing the stand device according to the teachings of the present invention may be a mechanical machine designed for a general docking purpose. In addition, the machine employing the stand device according to the present invention includes a device that provides a user with visual information and/or voice information at different levels according to a stand angle.

Further, the machine employing the stand device according to the present invention may include a wireless terminal that transmits and receives a signal of a corresponding frequency band at a different level according to the stand angle. For example, the stand device of the wireless terminal according to the present invention may function as an external antenna. Herein, the stand device may not only stand the wireless terminal, but also transmit and receive a wireless signal as antenna. In detail, the stand device as the external antenna is rotatable so as to transmit and receive a signal of a corresponding frequency band. The wireless terminal may be a mobile phone or a radio equipment etc.

Herein, the stand device may function as a main antenna to transmit and receive a signal of a corresponding frequency band.

In addition, the wireless terminal may have main (another) antenna to transmit and receive a signal of a corresponding frequency band. The stand device may transmit and receive a signal of an equal frequency band with that of the main antenna processes. That is, the stand device may assist the main antenna as an auxiliary antenna. Furthermore, the stand device may transmit and receive a signal of a frequency band different from that of a main antenna of the wireless terminal.

FIG. 1 is a perspective view of a machine employing a stand device according to an exemplary embodiment of the present invention, and visually illustrates a brief operation of the stand device. As shown, the inventive stand device can rotate a stand at various angles to prop up the machine. A structure and operation of the stand device will be described later.

Figure 2:
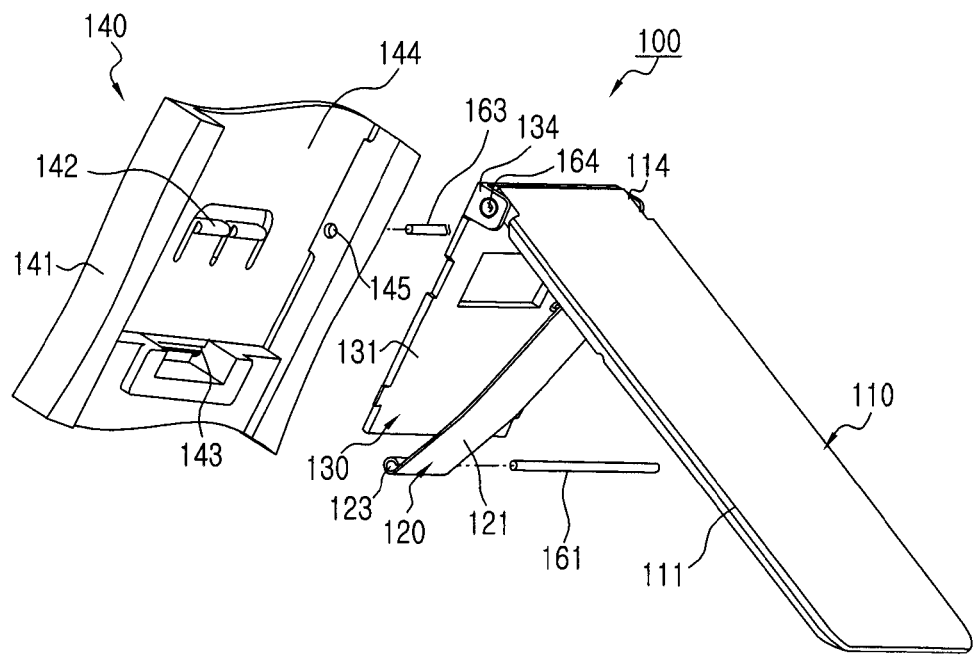
FIG. 2 is an exploded perspective view illustrating a stand device according to an exemplary embodiment of the present invention.

FIG. 2 is an exploded perspective view illustrating a stand device according to an exemplary embodiment of the present invention.

Referring to FIG. 2, a stand device 100 includes a stand 110 as a supporter for propping up the machine, a link arm 120 for allowing a seesaw motion when the stand 110 rotates, and a stand support 130 hinge-connected to one end of the stand 110 and linearly moving by the seesaw motion. Further, the stand device 100 includes a base panel 140 by which the link arm 120 is hinge-connected and guides a linear movement of the stand support 130.

The stand 110 includes a plate portion 111 which has a specific width and of which one end is formed with a hole 114 for the hinge-connection to the stand support 130 via a pin 164 or the like.

The link arm 120 includes a link portion 121 which has a specific width and of which both ends include holes 122 (illustrated in FIG. 3) and 123 for the hinge-connection to the base panel 140.

The stand support 130 includes a sliding portion 131 which moves linearly guided by the base panel 140. The sliding portion 131 forms a hinge arm 134 for the hinge-connection to the stand 110. In particular, the stand support 130 includes a locking portion 132 (illustrated in FIG. 3) to provide stepwise movements when moving linearly by interacting with the base panel 140.

The base panel 140 includes a hinge arm 143 for the hinge-connection to the link arm 120 using the pin 161 or the like, and a body 141 formed with a guard portion 144 to guide a linear movement of the sliding portion 131 of the stand support 130.

In particular, the body 141 includes a push protrusion 142 to provide stepwise movements of the stand support 130 by elastically pushing the locking portion 132 of the stand support 130. In the embodiment, the push protrusion 142 may protrude inside an opening portion formed in the sliding portion 131. The stand device 100 may further includes a guide bar 163 to avoid deterioration of the stepwise movements by supporting the push protrusion 142 and the locking portion 132. That is, the guide bar 163 can bring the locking portion 132 to be closely in contact with the push protrusion 142 in a reliable manner when the locking portion 132 is guided by the sliding portion 131 to move linearly due to a rotation movement of the stand. In this case, the body 141 forms a groove 145 to fasten the guide bar 163. Further, the base panel 140 may be a case frame that forms an external appearance of the machine or a constitutional element additionally fastened to the machine.

Figure 3:
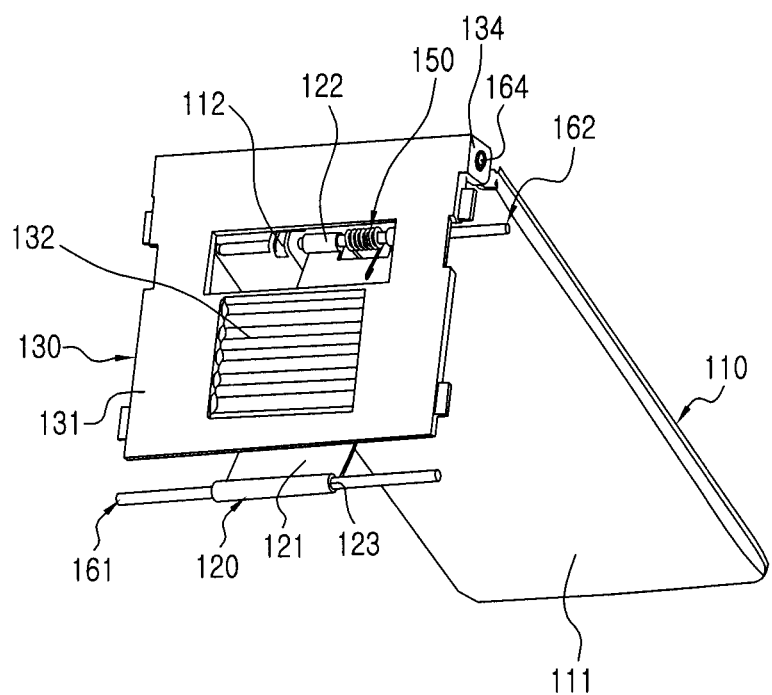
FIG. 3 is a perspective view illustrating stand device according to an exemplary embodiment of the present invention.

FIG. 3 is a perspective view illustrating a stand device according to an exemplary embodiment of the present invention. To avoid redundancy, those elements described in connection with FIG. 2 will be partially omitted in the following description with reference to FIG. 3.

Referring to FIG. 3, the sliding portion 131 of the stand support 130 includes the locking portion 132 having an uneven surface in contact with the push protrusion 142 formed on the guard portion 144 of the base panel 140. Therefore, when the sliding portion 131 linearly moves along the guard portion 144, stepwise movements are provided by a mutual operation of the push protrusion 142 and the locking portion 132.

Further, the plate portion 111 of the stand 110 includes a hinge arm 112 for the hinge-connection to the link arm 120. In particular, the stand device 100 includes a torsion spring 150 applied to the hinge arm 112 so that the stand 110 has a tendency to close in a direction of the base panel 140. One end of the torsion spring 150 is fastened to the link portion 121 of the link arm 120, and the other end thereof is fastened to the plate portion 111 of the stand 110. The torsion spring 150 is also applicable to the hinge arm 134 of the stand support 130.

Figure 4:
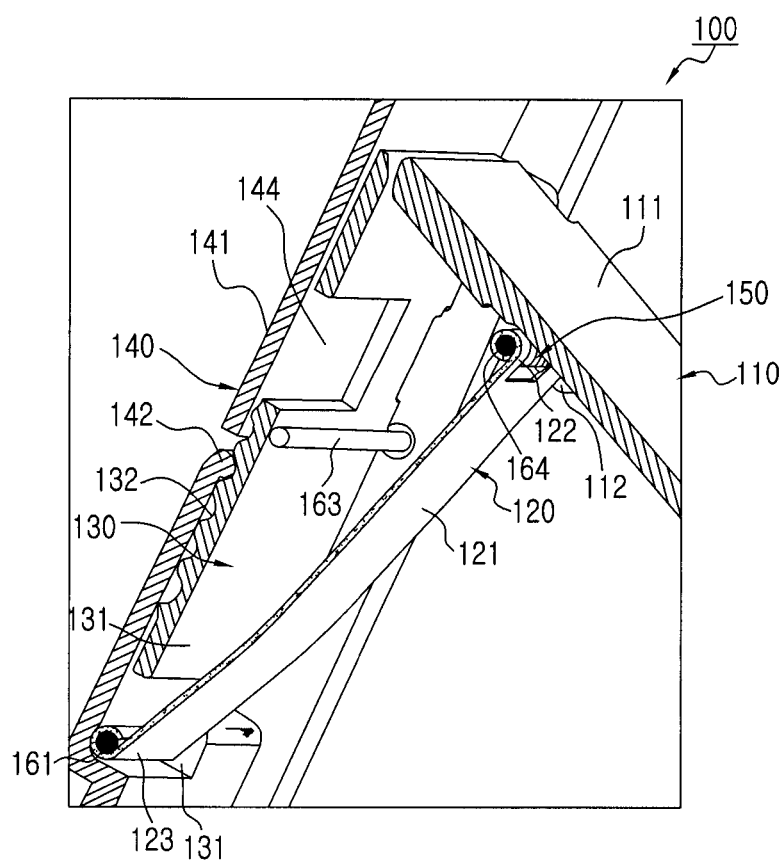
FIG. 4 is a cross-sectional perspective view illustrating a stand device according to an exemplary embodiment of the present invention.

FIG. 4 is a cross-sectional perspective view illustrating a stand device according to an exemplary embodiment of the present invention.

Referring to FIG. 4, the stand 110 performs a seesaw motion by the link arm 120 of which one end is hinge-connected to the plate portion 111 and the other end is hinge-connected to the base panel 140. Further, the stand 110 which performs the seesaw motion allows the stand support 130 to move linearly guided by the guard portion 144 of the base panel 140 by pushing or pulling the stand support 130 hinge-connected to one end portion of the plate portion 111. Further, the locking portion 132 of the stand support 130 and the push protrusion 142 of the base panel 140 that is elastically curved along the uneven surface of the locking portion 132 when the locking portion 132 moves linearly provide a user with the feeling that the stand 110 rotates stepwise. In addition thereto, any one of the stand support 130 and the base panel 140 may be formed with a locking portion having an uneven surface, and the other one may be formed with a push protrusion that is elastically curved by a relative linear movement.

Further, the torsion spring 150 disposed to a portion where the stand 110 is hinge-connected to the link arm 120 provides the user with the feeling that he or she is manipulating the stand 110 which is open and closed in the base panel 140.

Figure 5:
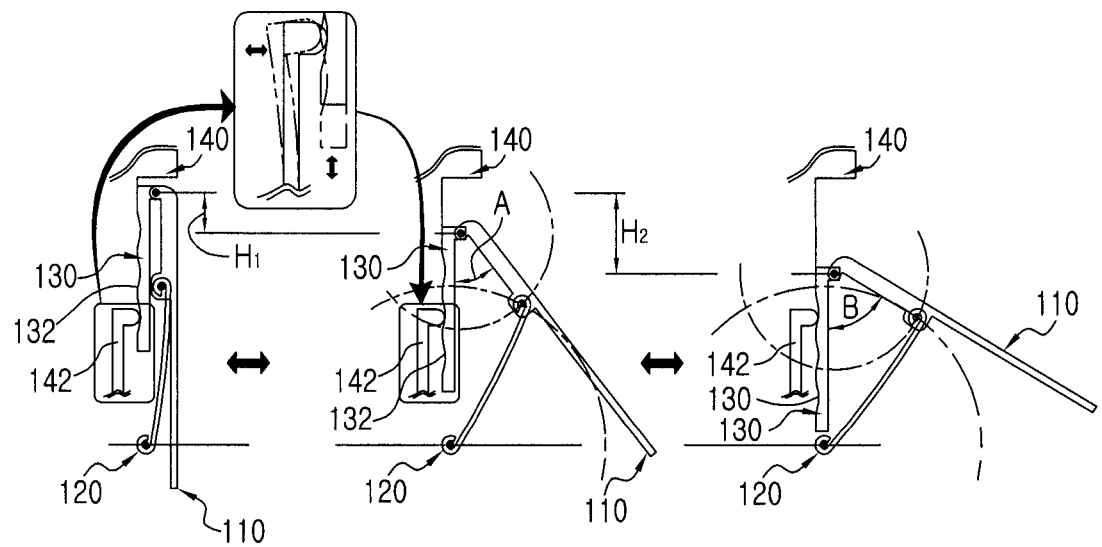
FIG. 5 illustrates a brief operation of a stand device according to an exemplary embodiment of the present invention.

FIG. 5 illustrates a brief visual operation of a stand device according to an exemplary embodiment of the present invention.

Referring to operations of FIG. 5, when the stand 110 rotates from an angle A to an angle B in the base panel 140, the stand support 130 hinge-connected to the stand 110 is lowered from $H_1$ to $H_2$.

Figure 6:
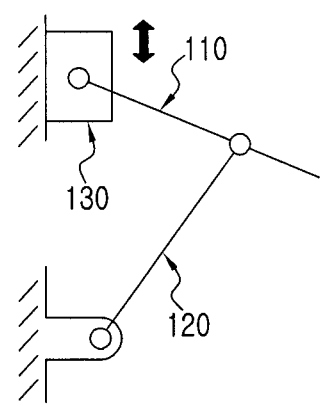
FIG. 6 illustrates the stand device 100 in brief according to view point of Design of Machinery.

FIG. 6 illustrates the stand device 100 according to view point of Design of Machinery to enhance the understanding of the present invention. A Degree of Freedom of the stand device 100 is 1, and the stand device 100 can be represented each element (i.e., the stand 110, the link arm 120, and the stand support 130) by using only one coordinate (e.g., a Y-axis, θ, etc.). Herein, division of a stepwise rotation angle of the stand 110 can be further classified according to steps divided by a mutual operation of the locking portion 132 and the push protrusion 142.

As is apparent from the foregoing, the present invention has an advantage in that the stand device provides easy propping up of at various angles. While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A stand device comprising:
   a base member;
   a sliding member disposed in the base member so that a linear reciprocal motion of the sliding member is possible;
   a stand member hinge-connected to the sliding member;
   a link member for holding the stand member, one end of the link member is hinge-connected to the stand member and the other end of the link member is hinge-connected to the base member; and
   an elastic member for rotating the stand member in a direction of the base member when the stand member is hinge-connected to the link member,
   wherein an opening angle of the stand member with respect to the base member varies depending on a linear reciprocal motion of the sliding member.

2. The stand device of claim 1, further comprising a movement control element for allowing the sliding member to move linearly stepwise along the base member.

3. The stand device of claim 2, wherein the movement control element provided in the sliding member comprises curved portions that linearly engages with a push protrusion of the base member to provide the stepwise movement.

4. The stand device of claim 1, wherein the base member is a case housing coupled to an external device or adaptively integrated as a part of the external device.

5. The stand device of claim 1, wherein when the stand member is completely closed, an external side of the stand member coincides with an external side of the base member.

6. The stand device of claim 1, further comprising a second elastic member for rotating the standing member in a predetermined direction of the base member when the sliding member is hinge-connected to the stand member.

7. The stand device of claim 1, wherein the stand member includes a locking portion and the base member includes a push protrusion to provide a stepwise movement of the stand member by elastically pushing the locking portion of the stand member when the stand member linearly interact with the base member.

8. The stand device of claim 6, wherein the stand member includes a locking portion and the base member includes a push protrusion to provide a stepwise movement of the stand member by elastically pushing the locking portion of the stand member when the stand member linearly interact with the base member.

9. The stand device of claim 7, wherein an elastic force by which the elastic member rotates the stand member in a direction of the base member is not enough for the push protrusion to be released from the locking portion.

10. The stand device of claim 8, wherein an elastic force by which the elastic member rotates the stand member in a direction of the base member is not enough for the push protrusion to be released from the locking portion.

11. The stand device of claim 1, wherein the elastic member is a torsion spring.

12. The stand device of claim 6, wherein the second elastic member is a torsion spring.

13. The stand device of claim 1, wherein the stand member has a width enough to completely cover the sliding member and the link member.

14. The stand device of claim 3, further comprising a bar fastened to the base member for supporting a locking portion such that the locking portion is closely in contact in a direction of the push protrusion.

15. The stand device of claim 1, wherein the link member allows a seesaw motion when the stand member rotates.

16. The stand device of claim 15, wherein the sliding member hinge-connected to one of the stand member linearly moves by the seesaw motion.

17. The stand device of claim 1, wherein the stand device coupled to a wireless terminal, which transmits and receives a signal of a corresponding frequency band.

18. The stand device of claim 17, wherein at least one of the sliding member, the stand member and link member is an antenna radiator for transmitting and receiving the signal.

19. The stand device of claim 17, wherein the wireless terminal comprises a main antenna for transmitting and receiving the signal, and the stand device transmits and receives a signal of a frequency band different from or equal to the main antenna.

20. The stand device of claim 17, wherein the stand device transmits and receives the signal at a different level according to a rotation angle of the stand member.

* * * * *